US012682472B2

(12) United States Patent
Kim et al.

(10) Patent No.: US 12,682,472 B2
(45) Date of Patent: Jul. 14, 2026

(54) METHOD AND APPARATUS FOR GENERATING DEPTH MAP

(71) Applicants: HYUNDAI MOTOR COMPANY, Seoul (KR); Kia Corporation, Seoul (KR)

(72) Inventors: Jang Yoon Kim, Seoul (KR); Woong Hyun Ka, Seoul (KR); Jin Sol Kim, Hwaseong-si (KR); Jin Woo Bae, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 233 days.

(21) Appl. No.: 18/752,145

(22) Filed: Jun. 24, 2024

(65) Prior Publication Data

US 2025/0182307 A1 Jun. 5, 2025

(30) Foreign Application Priority Data

Nov. 30, 2023 (KR) ........................ 10-2023-0171461

(51) Int. Cl.
*G06T 7/50* (2017.01)
*G01S 17/89* (2020.01)

(52) U.S. Cl.
CPC ................ *G06T 7/50* (2017.01); *G01S 17/89* (2013.01); *G06T 2207/10028* (2013.01)

(58) Field of Classification Search
CPC .. G06T 7/50; G06T 2207/10028; G01S 17/89
See application file for complete search history.

(56) References Cited

U.S. PATENT DOCUMENTS

| | | | | |
|---|---|---|---|---|
| 2021/0063578 A1* | 3/2021 | Wekel | ................... | G01S 17/894 |
| 2021/0150227 A1* | 5/2021 | Hu | ........................... | G06V 20/64 |
| 2022/0277515 A1* | 9/2022 | Chandler | ................ | G06T 19/00 |
| 2024/0378844 A1* | 11/2024 | Yu | .............................. | G06T 5/77 |

OTHER PUBLICATIONS

Yang, Zetong, Yanan Sun, Shu Liu, Xiaoyong Shen, and Jiaya Jia. "Ipod: Intensive point-based object detector for point cloud." arXiv preprint arXiv:1812.05276 (2018). (Year: 2018).*

* cited by examiner

*Primary Examiner* — David Perlman
(74) *Attorney, Agent, or Firm* — MORGAN, LEWIS & BOCKIUS LLP

(57) ABSTRACT

In a method and apparatus for generating a depth map, the method includes obtaining a LiDAR point cloud generated by a LiDAR, obtaining a 3D bounding box for at least a portion of the LiDAR point cloud, generating a first vehicle mask corresponding to the 3D bounding box from an image point cloud obtained by projecting coordinates of points of the LiDAR point cloud into an image coordinate system, and generating the depth map by removing distant points that are not included in the 3D bounding box among points included in the first vehicle mask.

20 Claims, 13 Drawing Sheets

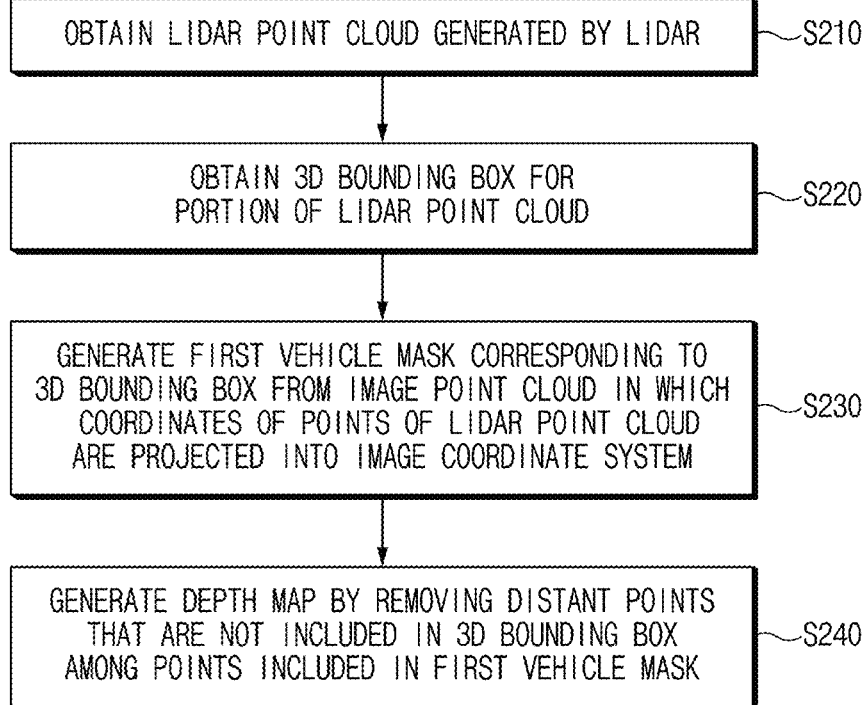

| OBTAIN LIDAR POINT CLOUD GENERATED BY LIDAR | ~S210 |

| OBTAIN 3D BOUNDING BOX FOR PORTION OF LIDAR POINT CLOUD | ~S220 |

| GENERATE FIRST VEHICLE MASK CORRESPONDING TO 3D BOUNDING BOX FROM IMAGE POINT CLOUD IN WHICH COORDINATES OF POINTS OF LIDAR POINT CLOUD ARE PROJECTED INTO IMAGE COORDINATE SYSTEM | ~S230 |

| GENERATE DEPTH MAP BY REMOVING DISTANT POINTS THAT ARE NOT INCLUDED IN 3D BOUNDING BOX AMONG POINTS INCLUDED IN FIRST VEHICLE MASK | ~S240 |

FIG.2

METHOD AND APPARATUS FOR GENERATING DEPTH MAP

CROSS-REFERENCE TO RELATED APPLICATION

The present application claims priority to Korean Patent Application No. 10-2023-0171461, filed on Nov. 30, 2023, the entire contents of which is incorporated herein for all purposes by this reference.

BACKGROUND OF THE PRESENT DISCLOSURE

Field of the Present Disclosure

The present disclosure relates to a method and apparatus for generating a depth map, and more particularly, to a method of generating a depth map by removing a point cloud that passes through the glass of a nearby vehicle from a Light Detection and Ranging (LiDAR) point cloud, and an apparatus thereof.

Description of Related Art

As deep neural network-based computer vision technology has recently developed in autonomous driving technology, various artificial intelligence models such as object detection, semantic segmentation, depth map estimation, lane detection, and the like have been studied.

For example, depth map estimation has been variously utilized to recognize surrounding situations and spaces, such as peripheral objects and free space, by use of a camera in an autonomous driving situation. Generally, to train a network that generates a depth map, a large amount of labeled and accurate learning data (e.g., a depth map for learning) is required.

A depth map for learning may be generated based on a LiDAR point cloud, but due to the limitation of a LiDAR that emits laser pulses, distant points that pass through the window of a nearby vehicle may be projected onto the depth map so that an inaccurate depth map is generated. Therefore, there may be a need to provide a method of generating a more accurate depth map for learning in which distant points are not projected onto the depth map from the window of a nearby vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus for generating a depth map by filtering a portion of a LiDAR point cloud generated by a LiDAR of an autonomous vehicle.

Another aspect of the present disclosure provides a method and apparatus for generating a depth map configured for removing a distant point so that the distant point is not projected from the window of a nearby vehicle onto the depth map.

Yet another aspect of the present disclosure provides a method and apparatus for generating a depth map configured for increasing the accuracy of a learning depth map used to train a depth map estimation network.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method of generating a depth map includes obtaining a LiDAR point cloud generated by a LiDAR, obtaining a 3D bounding box for at least a portion of the LiDAR point cloud, generating a first vehicle mask corresponding to the 3D bounding box from an image point cloud obtained by projecting coordinates of points of the LiDAR point cloud into an image coordinate system, and generating the depth map by removing distant points that are not included in the 3D bounding box among points included in the first vehicle mask.

According to an exemplary embodiment of the present disclosure, the obtaining of the 3D bounding box may include extracting a short-distance point cloud by removing a point cloud over a predetermined distance from the LiDAR point cloud, and obtaining the 3D bounding box based on the short-distance point cloud.

According to an exemplary embodiment of the present disclosure, the extracting of the short-distance point cloud may include determining the predetermined distance based on at least one of a focal length of the image point cloud and a degree of distortion of spacing between points of the image point cloud.

According to an exemplary embodiment of the present disclosure, the generating of the first vehicle mask may include generating the first vehicle mask by use of a gift warping algorithm or an alpha shape scheme for points included in the 3D bounding box in the image point cloud.

According to an exemplary embodiment of the present disclosure, the generating of the first vehicle mask may include determining a second vehicle mask generated by the alpha shape scheme as the first vehicle mask in response that a value obtained by dividing an area of the second vehicle mask generated by the alpha shape scheme by an area of a third vehicle mask generated by the gift warping algorithm is less than a threshold value.

According to an exemplary embodiment of the present disclosure, the generating of the first vehicle mask may include generating a camera point cloud that projects the coordinates of the points of the LiDAR point cloud into a camera coordinate system by multiplying the coordinates of the points of the LiDAR point cloud by an extrinsic matrix, and generating the image point cloud by changing a focal length of the camera point cloud.

According to an exemplary embodiment of the present disclosure, the generating of the image point cloud may include generating the image point cloud by converting a coordinate plane of points of a camera point cloud into an image plane in which a focal length has an arbitrary value in an image plane where the focal length is normalized to 1.

According to an exemplary embodiment of the present disclosure, the generating of the image point cloud may include generating the image point cloud by multiplying coordinates of the points of the camera point cloud by an intrinsic matrix.

According to an aspect of the present disclosure, an apparatus of generating a depth map includes a camera, a LiDAR that generates a LiDAR point cloud, and a processor that obtains a 3D bounding box for at least a portion of the LiDAR point cloud, generates a first vehicle mask corresponding to the 3D bounding box from an image point cloud that projects coordinates of points of the LiDAR point cloud into an image coordinate system, and generates the depth map by removing distant points that are not included in the 3D bounding box among points included in the first vehicle mask.

According to an exemplary embodiment of the present disclosure, the processor is further configured to extract a short-distance point cloud by removing a point cloud over a predetermined distance from the LiDAR point cloud, and generate the 3D bounding box based on the short-distance point cloud.

According to an exemplary embodiment of the present disclosure, the processor is further configured to determine the predetermined distance based on at least one of a focal length of the image point cloud and a degree of distortion of spacing between points of the image point cloud.

According to an exemplary embodiment of the present disclosure, the processor is further configured to generate the first vehicle mask by use of a gift warping algorithm or an alpha shape scheme for points included in the 3D bounding box in the image point cloud.

According to an exemplary embodiment of the present disclosure, the processor is further configured to determine a second vehicle mask generated by the alpha shape scheme as the first vehicle mask in response that a value obtained by dividing an area of the second vehicle mask generated by the alpha shape scheme by an area of a third vehicle mask generated by the gift warping algorithm is less than a threshold value.

According to an exemplary embodiment of the present disclosure, the processor is further configured to generate a camera point cloud by converting a coordinate reference point of the points of the LiDAR point cloud from the LiDAR to the camera.

According to an exemplary embodiment of the present disclosure, the processor is further configured to generate the camera point cloud by multiplying the coordinates of the points of the LiDAR point cloud by an extrinsic matrix.

According to an exemplary embodiment of the present disclosure, the processor is further configured to generate the image point cloud by converting a coordinate plane of points of a camera point cloud into an image plane where a focal length includes an arbitrary value in an image plane where the focal length is normalized to 1.

According to an exemplary embodiment of the present disclosure, the processor is further configured to generate the image point cloud by multiplying coordinates of the points of the camera point cloud by an intrinsic matrix.

According to an exemplary embodiment of the present disclosure, the LiDAR may be provided in a higher position than the camera in the vehicle.

According to an exemplary embodiment of the present disclosure, the LiDAR may be provided on the vehicle.

According to an exemplary embodiment of the present disclosure, the camera may be provided on the vehicle.

The features briefly summarized above with respect to the present disclosure are merely exemplary aspects of the detailed description of the present disclosure described below and do not limit the scope of the present disclosure.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is a flowchart illustrating a method of generating a depth map according to an exemplary embodiment of the present disclosure;

Figure 1:
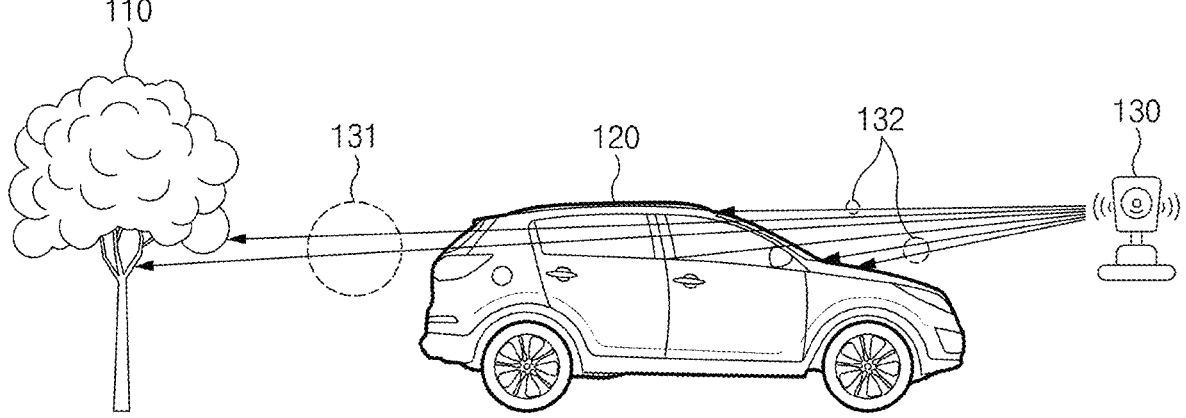
FIG. 1 is a diagram illustrating a method of generating a depth map according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the inventive concept will be described in detail with reference to the accompanying drawings, so that those skilled in the art can easily carry out the inventive concept. However, the inventive concept is not limited to the embodiments set forth herein and may be modified variously in many different forms.

In describing the exemplary embodiments of the present specification, in response that a specific description of the related art is deemed to obscure the subject matter of the exemplary embodiments of the present specification, the detailed description will be omitted. In the drawings, the portions irrelevant to the description will not be shown to make the present disclosure clear.

It will be understood that in response that an element is referred to as being "connected" or "coupled" to another element, it may be directly connected or indirectly connected to another element. Furthermore, in response that some part 'includes' or "has" some elements, unless explicitly described to the contrary, it means that other elements may be further included but not excluded.

Expressions such as "first," or "second," and the like, may express their elements regardless of their priority or importance and may be used to distinguish one element from another element but is not limited to these components. Therefore, without departing from the scope of the present disclosure, a first component of various exemplary embodiments of the present disclosure may be referred to as a second component of another exemplary embodiment of the present disclosure. Similarly, a second component of various exemplary embodiments of the present disclosure may be referred to as a first component of another exemplary embodiment of the present disclosure.

In an exemplary embodiment of the present disclosure, components that are distinguished from each other are only for clearly describing characteristics, and do not mean that the components are necessarily separated. That is, a plurality of components may be integrated to form a single hardware or software unit, or a single component may be distributed to form a plurality of hardware or software units. Accordingly, such integrated or distributed embodiments are included in the scope of the present disclosure, even though not mentioned separately.

In an exemplary embodiment of the present disclosure, components described In various embodiments do not necessarily mean essential components, and some may be optional components. Therefore, an exemplary embodiment composed of a subset of components described in an exemplary embodiment of the present disclosure is also included in the scope of the present disclosure. Furthermore, various exemplary embodiments including other components in addition to the components described in various exemplary embodiments of the present disclosure are also included in the scope of the present disclosure.

In an exemplary embodiment of the present disclosure, expressions of positional relationships used herein, such as upper, lower, left, right, and the like, are described for convenience of description. When viewing the drawings shown in the present specification in reverse, the positional relationship described in the specification may be interpreted in the opposite manner.

As used herein, each of such phrases as "A or B," "at least one of A and B," "at least one of A or B," "A, B, or C," "at least one of A, B, and C," and "at least one of A, B, or C,"

may include any one of, or all possible combinations of the items enumerated together in a corresponding one of the phrases.

Hereinafter, various exemplary embodiments of the present disclosure will be described in detail with reference to FIGS. 1 to 11.

FIG. 1 is a diagram illustrating a method of generating a depth map according to an exemplary embodiment of the present disclosure.

Referring to FIG. 1, a LiDAR 130 may emit laser pulses 131 and 132, and measure the time it takes for the laser pulse reflected by objects in the range to reach a receiver to estimate the distance and direction of the objects. However, because the laser pulses 131 and 132 pass through objects through which light passes without being reflected, it may be difficult to detect objects such as glass with the LiDAR 130. For example, the laser pulse 132 may be reflected by a counterparty vehicle 120 around the LiDAR, but the laser pulse 131 may be emitted in the direction of the window of the counterparty vehicle 120 and penetrate the window. The laser pulse 131 passing through the window may reach a tree 110 further away than the counterparty vehicle 120 and be reflected. Accordingly, an inconsistency may occur in which a part of the tree 110 beyond the window of the counterparty vehicle 120, which is not easily visible in the image by the camera, is visible in the depth map generated by the LiDAR 130. Distance information for the counterparty vehicle 120 may not be constant due to distant points appearing on the window of the counterparty vehicle 120, and therefore, the depth map may be unsuitable as a deep learning DB. Furthermore, hidden point removal filtering may not operate smoothly due to distant points. Therefore, there is a need to provide a method of generating a depth map configured for resolving the discrepancy between the image generated by the camera and the depth map generated by the LiDAR 130. A method of generating a depth map according to an exemplary embodiment of the present disclosure may generate the depth map suitable for supervised learning by removing distant points that appear on the window of the counterparty vehicle 120 in the short distance.

FIG. 2 is a flowchart illustrating a method of generating a depth map according to an exemplary embodiment of the present disclosure.

Figure 3A:
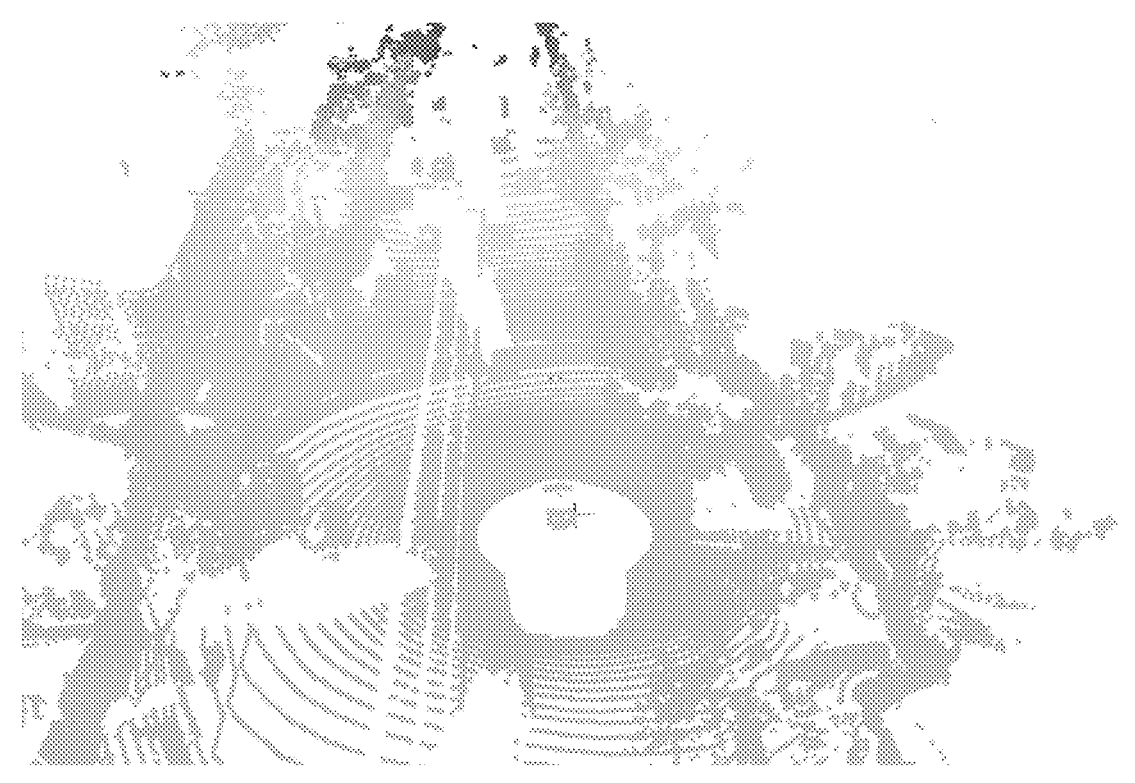
FIG. 3A is a diagram illustrating a point cloud in a LiDAR coordinate system according to an exemplary embodiment of the present disclosure.
Figure 3B:
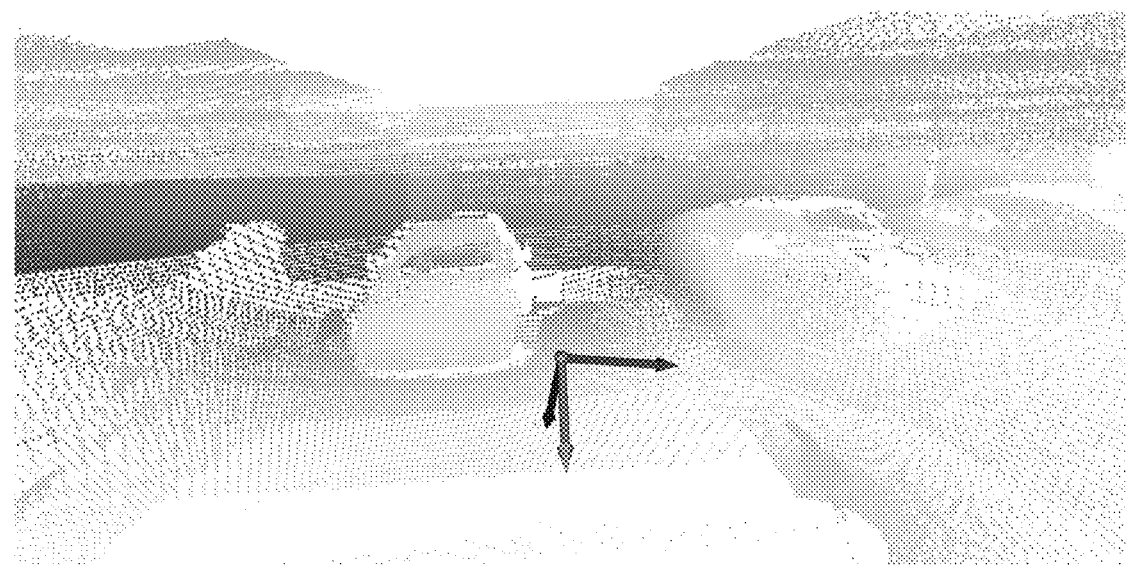
FIG. 3B is a diagram illustrating a point cloud projected onto a camera coordinate system according to an exemplary embodiment of the present disclosure.
Figure 3C:
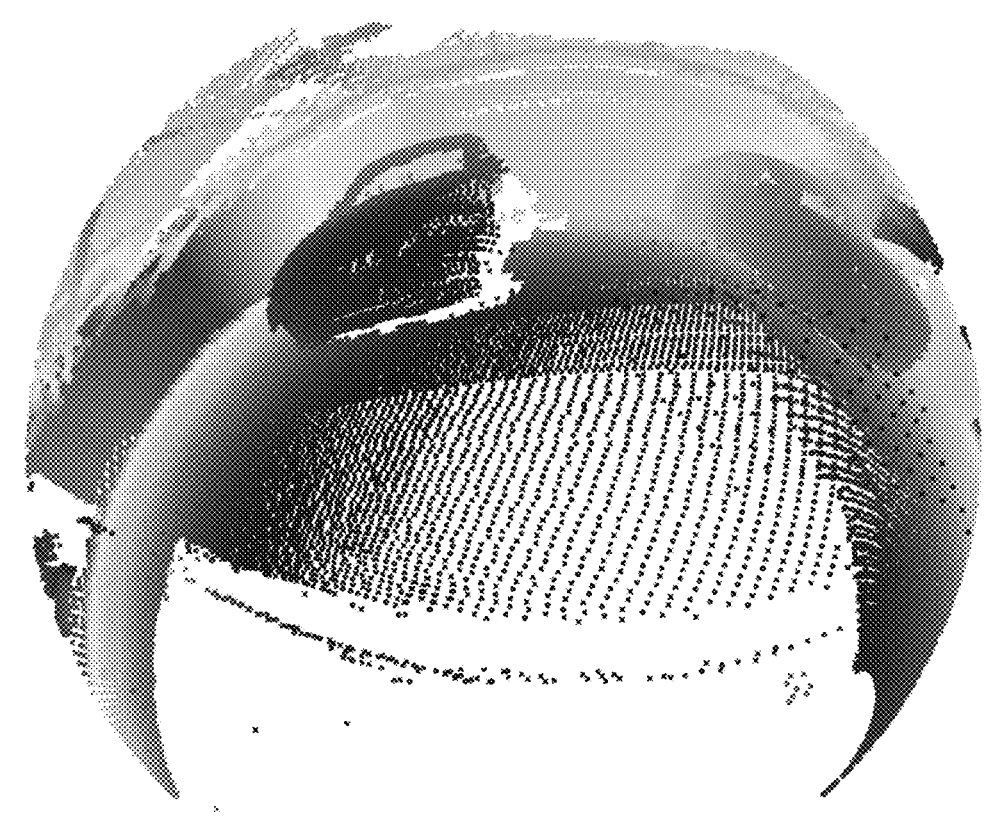
FIG. 3C is a diagram illustrating a point cloud projected into an image coordinate system according to an exemplary embodiment of the present disclosure.

FIG. 3A, FIG. 3B and FIG. 3C are diagrams illustrating a LiDAR point cloud, a camera point cloud, and an image point cloud according to an exemplary embodiment of the present disclosure, respectively. In the instant case, the camera point cloud may mean a point cloud obtained by projecting coordinates of the points of the LiDAR point cloud onto a camera coordinate system. Furthermore, the image point cloud may refer to a point cloud in which the coordinates of points in the camera point cloud are projected onto the image coordinate system.

Figure 4:
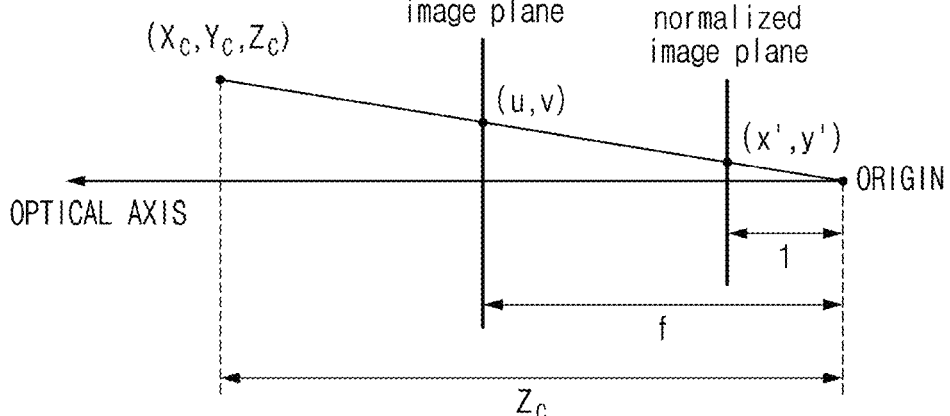
FIG. 4 is a diagram illustrating a process of projecting a point cloud into an image coordinate system according to an exemplary embodiment of the present disclosure.

FIG. 4 is a diagram illustrating an image point cloud according to an exemplary embodiment of the present disclosure. Hereinafter, FIG. 2 will be described with reference to FIG. 3A, FIG. 3B and FIGS. 3C and 4.

Referring to FIG. 2, a method of generating a depth map according to an exemplary embodiment of the present disclosure may obtain a LiDAR point cloud generated by a LiDAR in operation S210. For example, a LiDAR point cloud generated based on a LiDAR may be like the picture shown in FIG. 3A. Because the laser pulse of a LiDAR penetrates a window of a vehicle, the LiDAR point cloud does not include a LiDAR point for the window of a counterparty vehicle in a short distance, but rather a distant point for an object (e.g., the tree in FIG. 1) which is further away than the window.

According to the method of generating a depth map, in operation S220, a 3D bounding box for at least a portion of the LiDAR point cloud may be obtained.

For example, a method of generating a depth map may extract a short-distance point cloud by removing point clouds over a predetermined distance from the LiDAR point cloud. Furthermore, the method of generating a depth map may include generating a 3D bounding box based on a short-distance point cloud. The 3D bounding box may refer to a box-shaped label that distinguishes a class of a short-distance point cloud in a 3D coordinate system. The 3D bounding box may be obtained through a network that receives a short-distance point cloud and outputs a 3D bounding box for a counterparty vehicle. In response that GT labeling for the 3D bounding box exists, the network may be omitted. The detailed format of the 3D bounding box will be described below.

As described above, the short-distance point cloud may be a point cloud obtained by removing point clouds over a predetermined distance from a LiDAR point cloud. In the case of the windows of counterparty vehicles located at a predetermined distance or more, because the window point cloud may not be expressed at a distance due to being obscured by the point clouds caused by a window chassis, and the like, it is necessary to remove only the window point cloud of the counterparty vehicle for the short-distance point cloud. The predetermined distance may be determined based on the focal length of the image point cloud, the degree of distortion of the spacing of points in the image point cloud, and the like. The details of the image point cloud will be described below.

According to the method of generating a depth map, in operation S230, a first vehicle mask corresponding to a 3D bounding box may be generated from an image point cloud in which the coordinates of points of the LiDAR point cloud are projected onto an image coordinate system.

In a vehicle, the camera and the LiDAR may exist in different locations. For example, the LiDAR may be mounted in a higher position than a camera (e.g., on a vehicle) to recognize objects in the environment around the vehicle. Therefore, the LiDAR point cloud generated by the LiDAR and the image generated by the camera may not correspond to each other. Because the LiDAR point cloud is a point cloud generated based on the LiDAR as a coordinate reference point (origin), and the camera image is an image generated based on the camera as the coordinate reference point, to correspond the LiDAR point cloud to the camera image, it is necessary to convert the coordinate reference point of the LiDAR point cloud from the LiDAR to the camera. A point cloud in which the coordinate reference point of the points of the LiDAR point cloud is converted from the LiDAR to the camera may be referred to as a camera point cloud. For example, the picture shown in FIG. 3B shows a camera point cloud generated by converting the coordinate reference point of the LiDAR point cloud shown in FIG. 3A from the LiDAR to the camera.

To convert the coordinate reference point of the LiDAR point cloud from the LiDAR to the camera, an extrinsic matrix may be used. In detail, the camera point cloud may be generated by multiplying the coordinates of the points of the LiDAR point cloud by an extrinsic matrix. The specific equation may be as follows.

$$\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \times \begin{bmatrix} X \\ Y \\ Z \\ 1 \end{bmatrix} \qquad \text{[Equation 1]}$$

The matrix including $r_{11}$ to $r_{33}$ and $t_1$ to $t_3$ in Equation 1 as components corresponds to the extrinsic matrix. Among the components of the extrinsic matrix, $r_{11}$ to $r_{33}$ may correspond to components of a rotation matrix, and $t_1$ to $t_3$ may correspond to components of a translation matrix. Furthermore, X, Y and Z may represent the coordinates of points of the LiDAR point cloud. Coordinates (0, 0, 0), which are the coordinate reference point of the LiDAR point cloud, may indicate the location of the LiDAR. by multiplying the coordinates of the LiDAR point cloud and the extrinsic matrix, the camera point cloud with the position of the camera as a reference point may be generated.

Furthermore, an image point cloud may be generated by changing the focal length of the camera point cloud. For example, the camera point cloud in FIG. 3B may be changed to the image point cloud in FIG. 3C.

In detail, referring to FIG. 4, the coordinates of points of the camera point cloud may be converted from coordinates on a normalized image plane to coordinates on an image plane. In the instant case, the normalized image plane may mean a virtual space with a focal length of 1. Therefore, the image point cloud may be generated by changing the focal length of the camera point cloud. In other words, the method of generating a depth map may include generating the image point cloud by converting the coordinate plane of the points of the camera point cloud from an image plane with a focal length normalized to 1 to an image plane with a focal distance of an arbitrary value f.

Furthermore, coordinates corresponding to the normalized image plane may be converted to coordinates on the non-normalized image plane by being multiplied by an intrinsic matrix. For example, as shown in FIG. 4, in response that the coordinates of the points of the camera point cloud are (Xc, Yc, Zc), it may be referred to as the point (x', y') on the normalized image plane. In the instant case, x'=Xc/Zc and y'=Yc/Zc. Furthermore, in response that the point on the non-normalized image plane is (u, v), the following equation may be established.

$$\begin{bmatrix} u \\ v \\ 1 \end{bmatrix} = \begin{bmatrix} f_x & 0 & O_x \\ 0 & f_y & O_y \\ 0 & 0 & 1 \end{bmatrix} \begin{bmatrix} x' \\ y' \\ 1 \end{bmatrix} \qquad \text{[Equation 2]}$$

In the instant case, a matrix including $f_x$, $f_y$, $o_x$, and $o_y$ as components may be an intrinsic matrix. In the instant case, $f_x$ and $f_y$ may mean the coordinates of the focus, and $o_x$ and $o_y$ may mean the coordinates of a principal point.

The coordinate systems of the LiDAR point cloud and the camera point cloud may be a 3D coordinate system. The coordinates of the image point cloud may be normalized in the depth direction to correspond to 2D coordinates.

A first vehicle mask may be generated using the gift warping algorithm or alpha shape scheme for points included in the 3D bounding box in the image point cloud. However, the scheme of generating the first vehicle mask is not limited to the above-described method.

The method of generating a depth map may include determining the second vehicle mask generated by the alpha shape scheme as the first vehicle mask in response that a value obtained by dividing the area of the second vehicle mask generated by the alpha shape scheme by the area of a third vehicle mask generated by the gift warping algorithm is less than a threshold value. A specific algorithm for determining the first vehicle mask will be described later.

The method of generating a depth map may include generating a depth map by removing distant points that are not included in the 3D bounding box among the points included in the first vehicle mask in operation S240. Among the points included in the first vehicle mask, the distant points that are not included in the 3D bounding box may pass through the window of the counterparty vehicle (short-distance vehicle) and correspond to the points generated by laser pulses reflected upon an object (e.g., a tree in FIG. 1) which is further away than the counterparty vehicle. by removing distant points within the first vehicle mask, a more accurate depth map may be generated from which the points generated through the window are removed. An example related to distant point removal will be described later.

Figure 5:
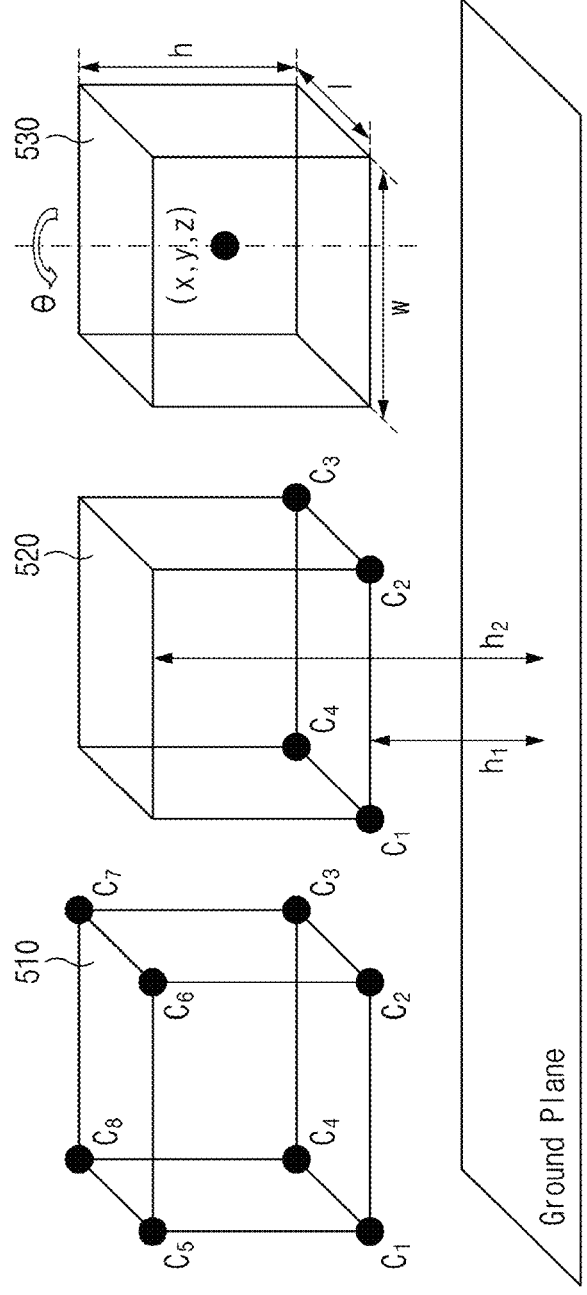
FIG. 5 is a diagram illustrating a 3D bounding box according to an exemplary embodiment of the present disclosure.

FIG. 5 is a diagram illustrating a 3D bounding box according to an exemplary embodiment of the present disclosure.

Referring to FIG. 5, the 3D bounding box may be generated in a free format. In detail, in response that it is possible to determine whether a specific point is included in the 3D bounding box, the format of the 3D bounding box may be free.

For example, like a 3D bounding box 510, the 3D bounding box may be generated through eight vertices C1 to C8.

Furthermore, like a 3D bounding box 520, the 3D bounding box may be generated through distances $h_1$ and $h_2$ from the ground plane and four vertices C1 to C4.

Furthermore, like a 3D bounding box 530, the 3D bounding box may be generated through a midpoint (x, y, z) and lengths (w, l) of the sides of the bottom portion of the bounding box and a height h.

The formats of the 3D bounding box described above are examples to aid understanding, and the 3D bounding box according to an exemplary embodiment of the present disclosure is not limited to the above.

Figure 6A:
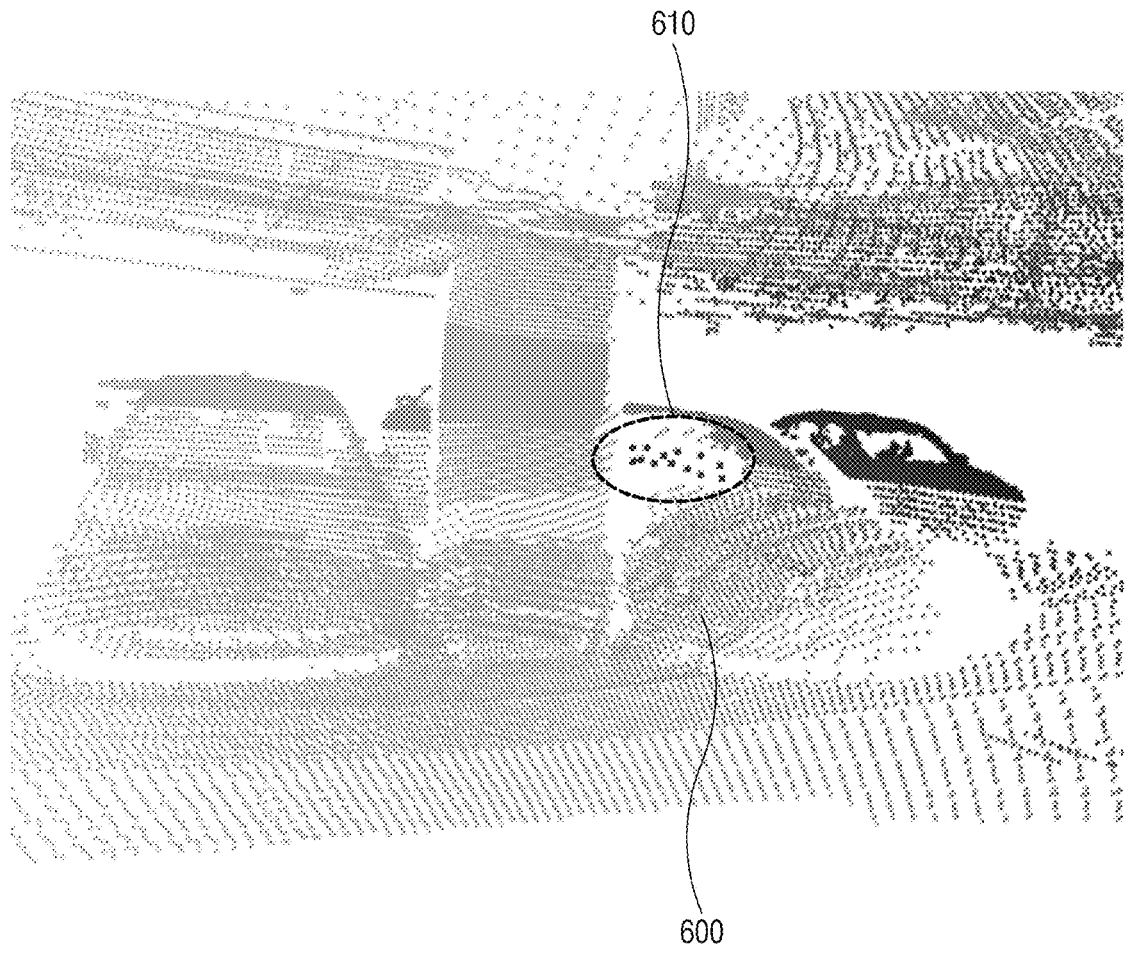
FIG. 6A is a diagram illustrating a distant point according to an exemplary embodiment of the present disclosure.

FIG. 6A is a diagram illustrating a distant point according to an exemplary embodiment of the present disclosure. FIG. 6A is a diagram illustrating an image point cloud where the darker the color of a point, the farther the point may be from the camera.

Referring to FIG. 6A, it may be understood that dark-colored distant points 610 appear on the front window of a counterparty vehicle 600 among an image point cloud. The distant points 610 may be points generated in response that the laser pulse of the LiDAR passes through the glass of the counterparty vehicle (short-distance vehicle) 600 and is reflected on an object farther than the counterparty vehicle 600. In the case of a depth map including the distant points 610, because the distance information of the counterparty vehicle 600 is not constant, it may not be suitable for the deep learning DB. Therefore, it is necessary to remove the distant points 610.

Figure 6B:
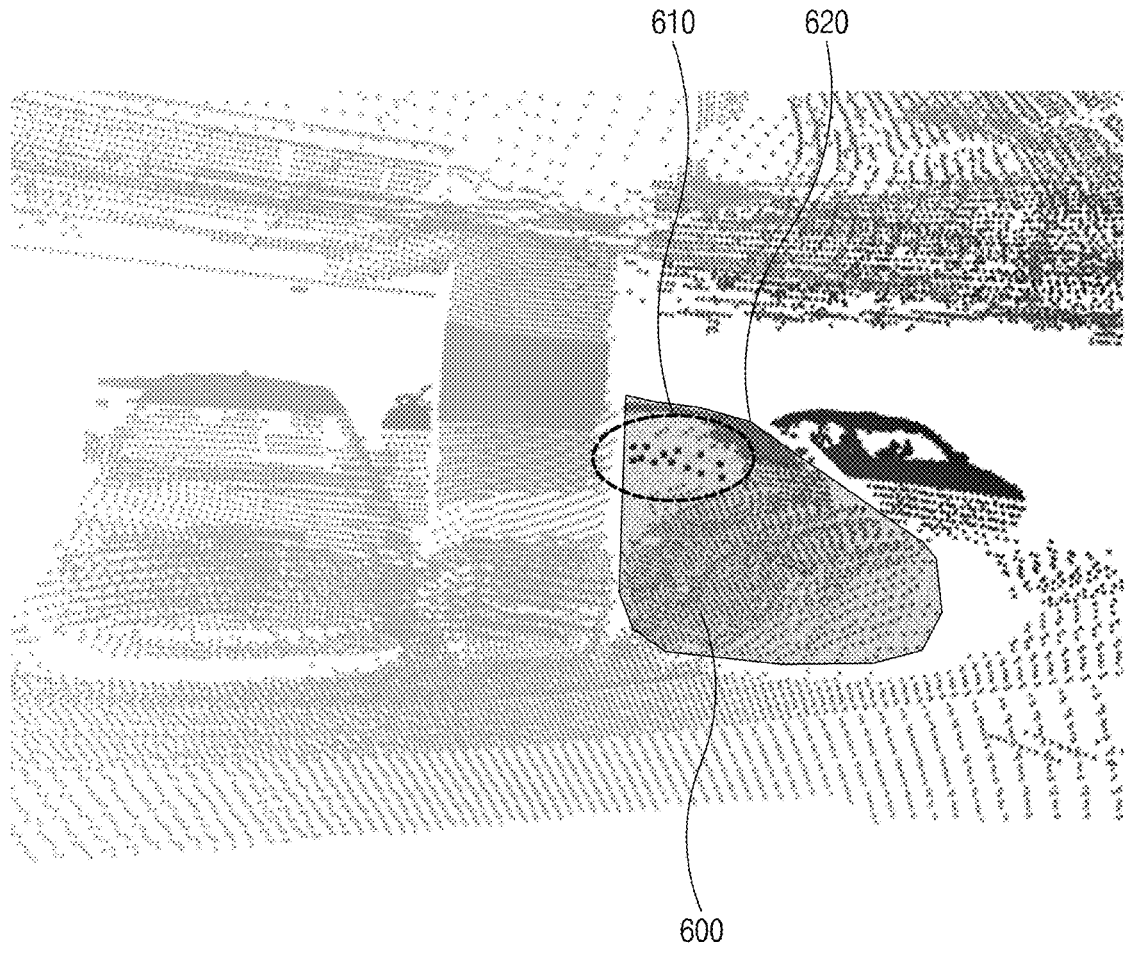
FIG. 6B is a diagram illustrating a distant point according to an exemplary embodiment of the present disclosure.

FIG. 6B is a diagram illustrating a distant point according to an exemplary embodiment of the present disclosure. FIG. 6B is a diagram illustrating an image point cloud where the darker the color of a point, the farther the point may be from the camera.

A vehicle mask 620 may be a vehicle mask for the counterparty vehicle 600. In detail, the vehicle mask 620 may be a vehicle mask corresponding to a 3D bounding box for the counterparty vehicle 600 in the image point cloud.

Accordingly, the distant points 610 are included in the vehicle mask 620, but may not be included in the 3D bounding box for the counterparty vehicle 600 because the distant points 610 are points for objects farther away than the vehicle. Therefore, a more accurate depth map may be generated by removing the distant points 610 which are included in the vehicle mask 620 of the counterparty vehicle 600 but not included in the 3D bounding box of the counterparty vehicle 600.

Figure 6C:
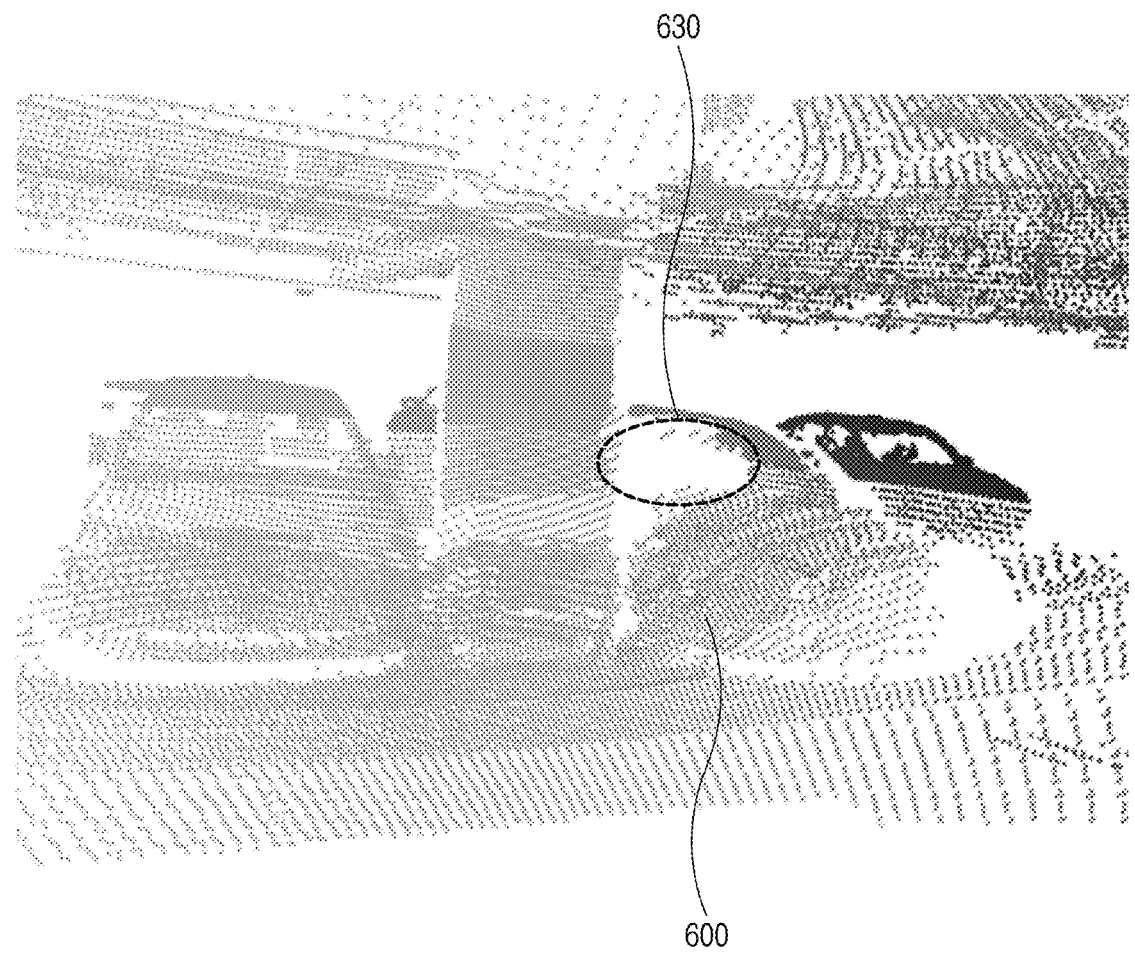
FIG. 6C is a diagram illustrating a distant point according to an exemplary embodiment of the present disclosure.

FIG. 6C is a diagram illustrating a distant point according to an exemplary embodiment of the present disclosure. FIG. 6C is a diagram illustrating an image point cloud where the darker the color of a point, the farther the point may be from the camera.

The image point cloud shown in FIG. 6C is an image point cloud in which the distant points 610 shown in FIG. 6A and FIG. 6B are removed. Accordingly, it may be understood that points corresponding to the front window of the counterparty vehicle 600 are removed as indicated by area 630. Therefore, the distance information for the counterparty vehicle 600 may be constant, and the discrepancy between the depth map generated by the LiDAR and the camera image may be eliminated.

Figure 7:
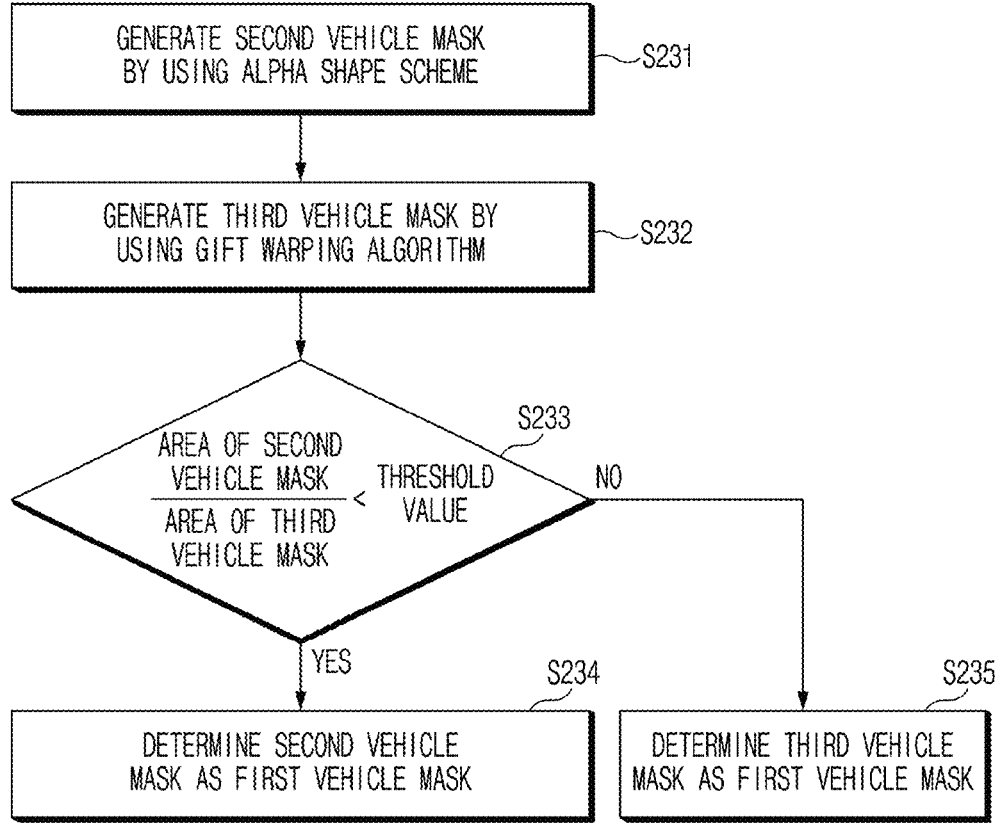
FIG. 7 is a flowchart illustrating a method of determining a vehicle mask according to an exemplary embodiment of the present disclosure.

FIG. 7 is a flowchart illustrating a method of determining a vehicle mask according to an exemplary embodiment of the present disclosure. The flowchart of FIG. 7 may be a flowchart of a method embodying operation S230 of FIG. 2.

The method of generating a depth map according to an exemplary embodiment of the present disclosure may include generating a second vehicle mask by use of the alpha shape scheme in operation S231.

Furthermore, the method of generating a depth map may include generating the third vehicle mask by use of a gift warping algorithm in operation S232.

Furthermore, in operation S233, the method of generating a depth map may include determining whether the value obtained by dividing the area of the second vehicle mask by the area of the third vehicle mask is smaller than a threshold value.

Furthermore, in operation S234, the method of generating a depth map may include determining the second vehicle mask as the first vehicle mask when the value obtained by dividing the area of the second vehicle mask by the area of the third vehicle mask is less than the threshold value. In other words, the second vehicle mask generated using the alpha shape scheme may be determined as the first vehicle mask.

Furthermore, according to the method of generating a death map, in operation S235, when the value obtained by dividing the area of the second vehicle mask by the area of the third vehicle mask is greater than or equal to a threshold value, the third vehicle mask may be determined as the first vehicle mask. In other words, the third vehicle mask generated using the gift warping algorithm may be determined as the first vehicle mask.

Figure 8:
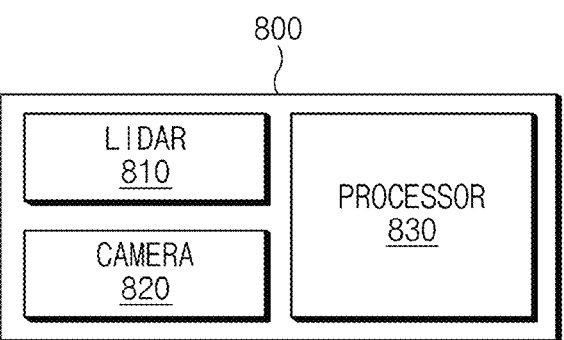
FIG. 8 is a block diagram illustrating an apparatus for generating a depth map according to an exemplary embodiment of the present disclosure.

FIG. 8 is a block diagram illustrating an apparatus for generating a depth map according to an exemplary embodiment of the present disclosure.

An apparatus 800 for generating a depth map according to an exemplary embodiment of the present disclosure may include a LiDAR 810, a camera 820, and a processor 830. The LiDAR 810 disclosed in FIG. 8 may be the same as the LiDAR 130 disclosed in FIG. 1.

The LiDAR 810 may be configured to generate a LiDAR point cloud.

The LiDAR 810 may be provided in a higher position than the camera 820 in a vehicle. Furthermore, the LiDAR 110 may be provided on a vehicle, but the exemplary embodiment of the present disclosure is not limited thereto.

Furthermore, the camera 820 may be provided on a vehicle, but the exemplary embodiment of the present disclosure is not limited thereto.

The processor 830 may be configured to generate a camera point cloud by changing coordinate reference points of points of a LiDAR point cloud based on a position difference between the LiDAR 810 and the camera 820. For example, the processor 830 may be configured to generate the camera point cloud by changing the coordinate reference points of the points of the LiDAR point cloud from the LiDAR 810 to the camera 820. Furthermore, the processor 830 may be configured to generate the camera point cloud by multiplying the coordinates of the points of the LiDAR point cloud by an extrinsic matrix.

Furthermore, the processor 830 may be configured to generate an image point cloud by changing a focal length of the camera point cloud. In detail, the processor 830 may be configured to generate the image point cloud by converting the coordinate plane of the points of the camera point cloud from an image plane where the focal length thereof is normalized to 1 to an image plane where the focal length has an arbitrary value. For example, the processor 830 may be configured to generate an image point cloud by multiplying the coordinates of the points in the camera point cloud by an intrinsic matrix.

Furthermore, the processor 830 may be configured to obtain a 3D bounding box for the LiDAR point cloud. For example, the processor 830 may be configured to convert the LiDAR point cloud into a short-range point cloud by removing point clouds over a predetermined distance among the LiDAR point clouds, and generate the 3D bounding box based on the short-range point cloud. Furthermore, the processor 830 may be configured to determine a predetermined distance based on the focal distance.

Furthermore, the processor 830 may be configured to generate the first vehicle mask corresponding to the 3D bounding box in the image point cloud. For example, the processor 830 may be configured to generate the first vehicle mask by use of a gift warping algorithm or an alpha shape scheme for points included in the 3D bounding box in the image point cloud. In detail, the processor 830 may be configured to determine the second vehicle mask generated by the alpha shape scheme as the first vehicle mask when a value obtained by dividing the area of the second vehicle mask generated by the alpha shape scheme by the area of a third vehicle mask generated by the gift warping algorithm is less than a threshold value.

Furthermore, the processor 830 may be configured to generate the depth map by removing distant points that are not included in the 3D bounding box among the points included in the first vehicle mask.

Figure 9:
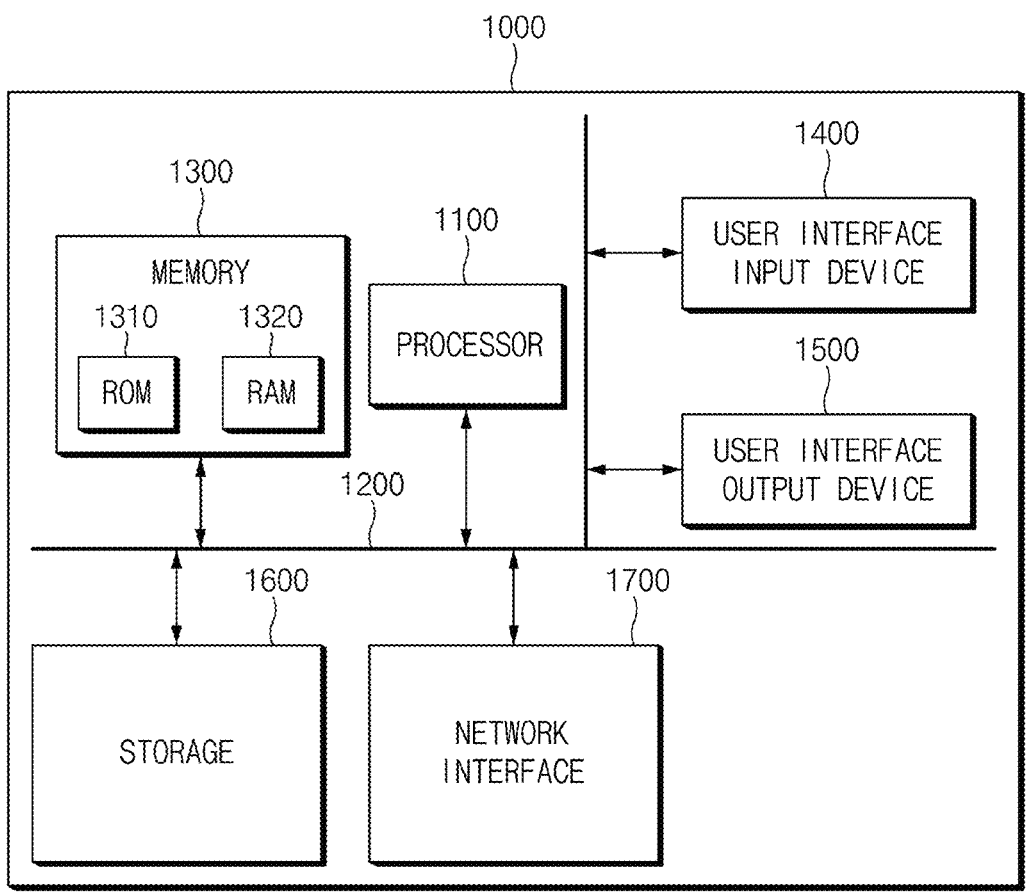
FIG. 9 is a block diagram illustrating a computing system for executing a method of generating a depth map according to an exemplary embodiment of the present disclosure.

FIG. 9 is a block diagram illustrating a computing system for executing a method of determining fail-safe of camera image recognition according to various exemplary embodiments of the present disclosure.

Referring to FIG. 10, a method of determining fail-safe of camera image recognition according to an exemplary embodiment of the present disclosure described above may be implemented through a computing system 1000. The computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU) or a semiconductor device that processes instructions stored in the memory 1300 and/or the storage 1600. The processor 1100 may correspond to the processor 8 of FIG. 8.

The memory 1300 and the storage 1600 may include various types of volatile or non-volatile storage media. For example, the memory 1300 may include a Read-Only Memory (ROM) 1310 and a Random Access Memory (RAM) 1320.

Accordingly, the processes of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

According to an exemplary embodiment of the present disclosure, it is possible to generate an accurate learning depth map for training a network that generates the depth map.

According to an exemplary embodiment of the present disclosure, an accurate depth map may be generated by removing distant points from the window of a nearby counterparty vehicle so that the distant points are not projected onto the depth map.

Effects obtained by various embodiments of the present disclosure may not be limited to the above, and other effects will be clearly understandable to those including ordinary skill in the art from the following disclosures.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of generating a depth map, the method comprising:
   obtaining, by a processor, a Light Detection and Ranging (LiDAR) point cloud generated by a LiDAR operatively connected to the processor;
   obtaining, by the processor, a 3D bounding box for at least a portion of the LiDAR point cloud;
   generating, by the processor, a first vehicle mask corresponding to the 3D bounding box from an image point cloud obtained by projecting coordinates of points of the LiDAR point cloud into an image coordinate system; and
   generating, by the processor, the depth map by removing distant points that are not included in the 3D bounding box among points included in the first vehicle mask.

2. The method of claim 1, wherein the obtaining of the 3D bounding box includes:

extracting a short-distance point cloud by removing a point cloud over a predetermined distance from the LiDAR point cloud; and
obtaining the 3D bounding box based on the short-distance point cloud.

3. The method of claim 2, wherein the extracting of the short-distance point cloud includes determining the predetermined distance based on at least one of a focal length of the image point cloud and a degree of distortion of spacing between points of the image point cloud.

4. The method of claim 1, wherein the generating of the first vehicle mask includes generating the first vehicle mask by use of a gift warping algorithm or an alpha shape scheme for points included in the 3D bounding box in the image point cloud.

5. The method of claim 4, wherein the generating of the first vehicle mask includes determining a second vehicle mask generated by the alpha shape scheme as the first vehicle mask in response that a value obtained by dividing an area of the second vehicle mask generated by the alpha shape scheme by an area of a third vehicle mask generated by the gift warping algorithm is less than a threshold value.

6. The method of claim 1, wherein the generating of the first vehicle mask includes:
   generating a camera point cloud that projects the coordinates of the points of the LiDAR point cloud into a camera coordinate system by multiplying the coordinates of the points of the LiDAR point cloud by an extrinsic matrix; and
   generating the image point cloud by changing a focal length of the camera point cloud.

7. The method of claim 1, wherein the generating of the first vehicle mask includes generating the image point cloud by converting a coordinate plane of points of a camera point cloud obtained by projecting the coordinates of the points of the LiDAR point cloud into a camera coordinate system into an image plane in which a focal length has an arbitrary value in an image plane where the focal length is normalized to 1.

8. The method of claim 7, wherein the generating of the image point cloud includes generating the image point cloud by multiplying coordinates of the points of the camera point cloud by an intrinsic matrix.

9. An apparatus of generating a depth map, the apparatus comprising:
   a camera;
   a Light Detection and Ranging (LiDAR) configured to generate a LiDAR point cloud; and
   a processor operatively connected to the camera and the LiDAR and configured to obtain a 3D bounding box for at least a portion of the LiDAR point cloud, generate a first vehicle mask corresponding to the 3D bounding box from an image point cloud that projects coordinates of points of the LiDAR point cloud into an image coordinate system, and generate the depth map by removing distant points that are not included in the 3D bounding box among points included in the first vehicle mask.

10. The apparatus of claim 9, wherein the processor is further configured to extract a short-distance point cloud by removing a point cloud over a predetermined distance from the LiDAR point cloud, and generate the 3D bounding box based on the short-distance point cloud.

11. The apparatus of claim 10, wherein the processor is further configured to determine the predetermined distance based on at least one of a focal length of the image point cloud and a degree of distortion of spacing between points of the image point cloud.

12. The apparatus of claim 9, wherein the processor is further configured to generate the first vehicle mask by use of a gift warping algorithm or an alpha shape scheme for points included in the 3D bounding box in the image point cloud.

13. The apparatus of claim 12, wherein the processor is further configured to determine a second vehicle mask generated by the alpha shape scheme as the first vehicle mask in response that a value obtained by dividing an area of the second vehicle mask generated by the alpha shape scheme by an area of a third vehicle mask generated by the gift warping algorithm is less than a threshold value.

14. The apparatus of claim 9, wherein the processor is further configured to generate a camera point cloud by converting a coordinate reference point of the points of the LiDAR point cloud from the LiDAR to the camera.

15. The apparatus of claim 14, wherein the processor is further configured to generate the camera point cloud by multiplying the coordinates of the points of the LiDAR point cloud by an extrinsic matrix.

16. The apparatus of claim 9, wherein the processor is further configured to generate the image point cloud by converting a coordinate plane of points of a camera point cloud obtained by projecting the coordinates of the points of the LiDAR point cloud into a camera coordinate system into an image plane where a focal length includes an arbitrary value in an image plane where the focal length is normalized to 1.

17. The apparatus of claim 16, wherein the processor is further configured to generate the image point cloud by multiplying coordinates of the points of the camera point cloud by an intrinsic matrix.

18. The apparatus of claim 9, wherein the LiDAR is provided in a higher position than the camera in the vehicle.

19. The apparatus of claim 9, wherein the LiDAR is provided on the vehicle.

20. The apparatus of claim 9, wherein the camera is provided on the vehicle.

* * * * *